(12) United States Patent
Ikegaya et al.

(10) Patent No.: US 12,420,660 B2
(45) Date of Patent: Sep. 23, 2025

(54) VEHICLE, DELIVERY SYSTEM, SERVER, AND PROGRAM FOR DELIVERY SYSTEM

(71) Applicant: Yazaki Corporation, Tokyo (JP)

(72) Inventors: Koji Ikegaya, Susono (JP); Masahiro Ito, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 713 days.

(21) Appl. No.: 17/854,472

(22) Filed: Jun. 30, 2022

(65) Prior Publication Data

US 2023/0019029 A1    Jan. 19, 2023

(30) Foreign Application Priority Data

Jul. 13, 2021  (JP) ................. 2021-115646

(51) Int. Cl.
| | |
|---|---|
| *H02J 7/00* | (2006.01) |
| *B60L 53/54* | (2019.01) |
| *B60L 53/66* | (2019.01) |
| *B60L 53/68* | (2019.01) |
| *G06Q 10/0631* | (2023.01) |
| *G06Q 10/08* | (2023.01) |
| *H02J 7/14* | (2006.01) |
| *F17C 7/02* | (2006.01) |

(52) U.S. Cl.
CPC .............. *B60L 53/68* (2019.02); *B60L 53/54* (2019.02); *B60L 53/665* (2019.02); *G06Q 10/0631* (2013.01); *G06Q 10/08* (2013.01); *F17C 7/02* (2013.01); *F17C 2221/012* (2013.01); *F17C 2270/0139* (2013.01)

(58) Field of Classification Search
CPC ......... B60L 53/68; B60L 53/54; B60L 53/665
USPC ........................................... 320/134
See application file for complete search history.

(56) References Cited

U.S. PATENT DOCUMENTS

| | | | | |
|---|---|---|---|---|
| 5,833,294 | A * | 11/1998 | Williams | B60S 5/00 296/24.32 |
| 6,755,225 | B1* | 6/2004 | Niedwiecki | F17C 7/02 141/2 |
| 7,328,728 | B1* | 2/2008 | Vilar | B67D 7/845 137/565.17 |
| 7,678,479 | B2* | 3/2010 | McLean | C01B 3/065 423/657 |
| 2005/0247123 | A1 | 11/2005 | Fuse | |
| 2007/0138006 | A1* | 6/2007 | Oakes | B60L 58/30 204/266 |
| 2008/0297103 | A1* | 12/2008 | Windsor | H02J 7/0029 361/601 |

(Continued)

FOREIGN PATENT DOCUMENTS

| | | |
|---|---|---|
| JP | 2002-315111 A | 10/2002 |
| JP | 2005-220946 A | 8/2005 |

(Continued)

*Primary Examiner* — Alexis B Pacheco
(74) *Attorney, Agent, or Firm* — Sughrue Mion, PLLC

(57) ABSTRACT

A vehicle is equipped with a hydrogen tank that stores hydrogen, a fuel cell that generates electricity from the hydrogen in the hydrogen tank, a filling device 4 that fills a fuel cell vehicle with the hydrogen stored in the hydrogen tank, and a charger with which electricity generated by the fuel cell is charged to an electric vehicle. Using the vehicle, hydrogen and electricity are delivered to the home of a user.

5 Claims, 5 Drawing Sheets

(56) References Cited

U.S. PATENT DOCUMENTS

| | | | | |
|---|---|---|---|---|
| 2011/0266360 | A1* | 11/2011 | Gudat | B05B 13/00 239/11 |
| 2012/0193153 | A1* | 8/2012 | Wellborn | B60W 10/08 180/14.2 |
| 2012/0271758 | A1* | 10/2012 | Jammer | G07F 15/003 701/22 |
| 2012/0303397 | A1* | 11/2012 | Prosser | B60L 53/18 705/7.12 |
| 2013/0175819 | A1* | 7/2013 | Hindle | B60L 3/00 296/24.3 |
| 2016/0375780 | A1* | 12/2016 | Penilla | G06Q 50/06 320/109 |
| 2017/0327091 | A1* | 11/2017 | Capizzo | H01M 10/30 |
| 2017/0362076 | A1* | 12/2017 | Hall | H04W 4/44 |
| 2017/0363432 | A1* | 12/2017 | Hall | B67D 7/04 |
| 2018/0100319 | A1* | 4/2018 | Murley | E04H 1/14 |
| 2018/0257499 | A1* | 9/2018 | Velev | B60L 53/14 |
| 2018/0300823 | A1* | 10/2018 | Aubuchon | G06Q 20/322 |
| 2018/0339682 | A1* | 11/2018 | Hall | G06Q 20/145 |
| 2019/0135125 | A1* | 5/2019 | Sponheimer | B60L 53/12 |
| 2020/0090260 | A1 | 3/2020 | Todo et al. | |
| 2020/0262305 | A1* | 8/2020 | Chakraborty | B60L 53/57 |
| 2020/0376974 | A1* | 12/2020 | Freese, V | G05D 1/0238 |
| 2020/0384880 | A1* | 12/2020 | Gibbs | B60L 58/18 |
| 2021/0129695 | A1* | 5/2021 | De Blasio | B60L 53/62 |
| 2021/0155108 | A1* | 5/2021 | Martin | B60L 53/35 |
| 2021/0199451 | A1 | 7/2021 | Murata et al. | |
| 2021/0245719 | A1* | 8/2021 | Hall | G07C 5/0808 |
| 2023/0032979 | A1* | 2/2023 | Neligan | B60L 53/52 |
| 2023/0116006 | A1* | 4/2023 | Cioffi | H01M 8/04753 141/1 |
| 2023/0339351 | A1* | 10/2023 | Andreas | B60L 50/70 |

FOREIGN PATENT DOCUMENTS

| | | |
|---|---|---|
| JP | 2005-283127 A | 10/2005 |
| JP | 2006-188346 A | 7/2006 |
| JP | 2009-282838 A | 12/2009 |
| JP | 2011-80490 A | 4/2011 |
| JP | 2017-45309 A | 3/2017 |
| JP | 2018-71658 A | 5/2018 |
| JP | 2020-41652 A | 3/2020 |
| JP | WO2020/075771 A1 | 4/2020 |
| JP | 2020-99128 A | 6/2020 |
| JP | 2020-188592 A | 11/2020 |
| WO | 2020/075771 A1 | 4/2020 |

* cited by examiner

VEHICLE, DELIVERY SYSTEM, SERVER, AND PROGRAM FOR DELIVERY SYSTEM

CROSS REFERENCE TO RELATED APPLICATIONS

This application is based on and claims priority from Japanese patent application No. 2021-115646 filed on Jul. 13, 2021, the entire contents of which are incorporated herein by reference.

TECHNICAL FIELD

The present invention relates to a vehicle, a delivery system, a server, and a computer-readable storage medium storing program for delivery system.

BACKGROUND ART

With a purpose of preventing environmental pollution caused by exhaust gas and with diversification of fuel, fuel cell vehicles and electric vehicles are expected to be widely used. Therefore, various techniques relating to a hydrogen station for filling a fuel cell vehicle with hydrogen (Patent Literatures 1 to 5) and a technique relating to a charging station for charging an electric vehicle (Patent Literature 6) have been proposed.

CITATION LIST

Patent Literature

Patent Literature 1: JP-A-2002-315111
Patent Literature 2: JP-A-2005-220946
Patent Literature 3: JP-A-2005-283127
Patent Literature 4: JP-A-2018-71658
Patent Literature 5: WO2020/075771
Patent Literature 6: JP-A-2020-99128

SUMMARY OF INVENTION

However, since the number of hydrogen stations and charging stations is overwhelmingly small, it is not easy to fill the fuel cell vehicle with hydrogen or to charge the electric vehicle, which hinders the spread of the fuel cell vehicle and the electric vehicle.

According to embodiments, with a vehicle, a delivery system, a server, and a computer-readable storage medium storing program for delivery system, a fuel cell vehicle can be easily filled with hydrogen and an electric vehicle can be easily charged with electricity.

Solution to Problem

According to an embodiment, a vehicle includes:
a hydrogen tank that stores hydrogen;
a fuel cell that generates electricity from the hydrogen in the hydrogen tank;
a filling device that fills a fuel cell vehicle with the hydrogen stored in the hydrogen tank; and
a charger with which electricity generated by the fuel cell is charged to an electric vehicle.

According to an embodiment, a delivery system includes:
a plurality of terminals; and
a server that is capable of communicating with the plurality of terminals.

The server includes a reservation acceptance unit that accepts at least one of a hydrogen filling reservation of a fuel cell vehicle and a charging reservation of an electric vehicle through communication with the plurality of the terminals, and
a delivery schedule creation unit that creates a delivery schedule for the vehicle according to a first aspect, based on position information of the fuel cell vehicle or the electric vehicle registered in advance in association with the terminal via which a reservation is accepted by the reservation acceptance unit.

According to an embodiment, a server is
capable of communicating with a plurality of terminals. The server includes
a reservation acceptance unit that accepts, through communication with the plurality of terminals, at least one of a hydrogen filling reservation of a fuel cell vehicle and a charging reservation of an electric vehicle, which are registered in advance in association with the plurality of terminals, and
a delivery schedule creation unit that creates a delivery schedule for the vehicle according to a first aspect based on position information registered in advance in association with the fuel cell vehicle or the electric vehicle for which a reservation is accepted by the reservation acceptance unit.

According to an embodiment, a computer-readable storage medium storing program for delivery system causes a computer to function as
a reservation acceptance unit that accepts, through communication with a plurality of terminals, at least one of a hydrogen filling reservation of a fuel cell vehicle and a charging reservation of an electric vehicle, which are registered in advance in association with the plurality of terminals, and
a delivery schedule creation unit that creates a delivery schedule for the vehicle according to a first aspect based on position information registered in advance in association with the fuel cell vehicle or the electric vehicle for which a reservation is accepted by the reservation acceptance unit.

DESCRIPTION OF EMBODIMENTS

Specific embodiments will be described below with reference to the drawings.

Figure 1:
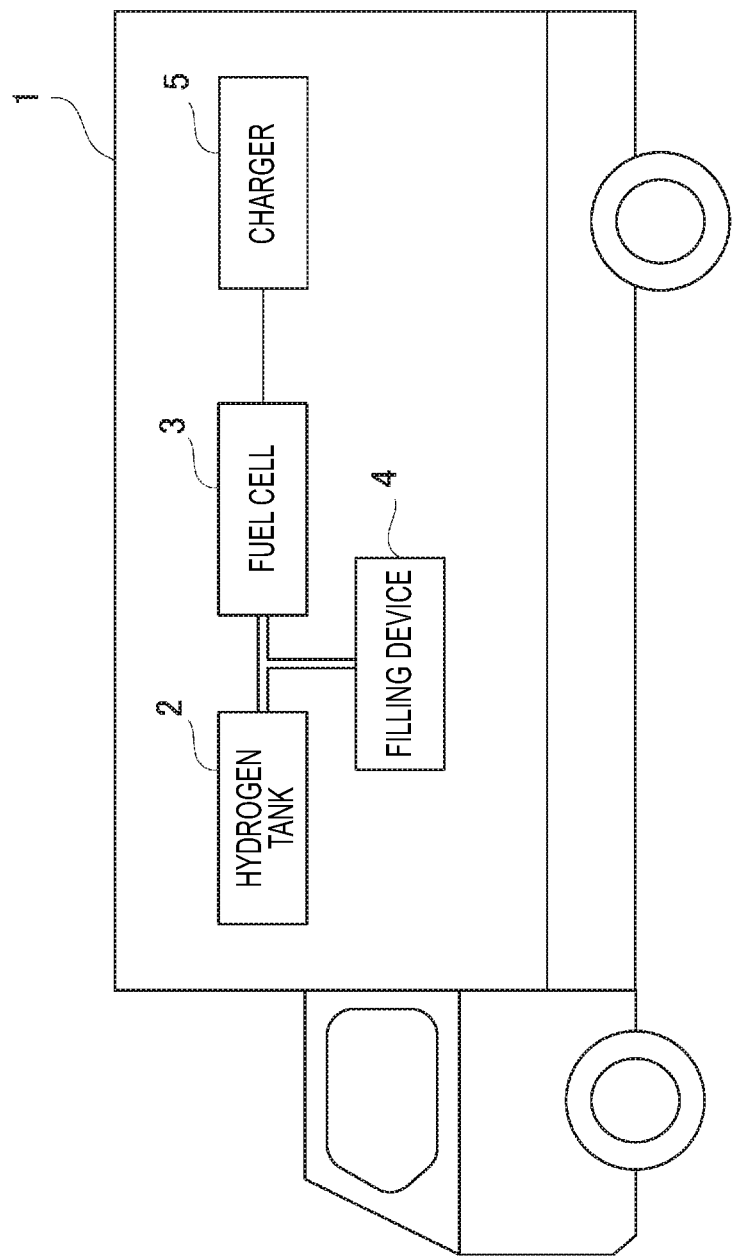
FIG. 1 is a configuration diagram illustrating an embodiment of a vehicle according to the present invention.

As illustrated in FIG. 1, a vehicle 1 is equipped with a hydrogen tank 2, a fuel cell 3, a filling device 4, and a charger 5. The hydrogen tank 2 is a tank capable of storing hydrogen, and can be filled with hydrogen at a hydrogen station. When hydrogen in the hydrogen tank 2 is supplied to the fuel cell 3, a chemical reaction between the hydrogen and oxygen is caused therein to generate electricity. The filling device 4 is a device for filling a fuel cell vehicle with the hydrogen stored in the hydrogen tank 2. The charger 5 is a device for charging an electric vehicle with the electricity generated by the fuel cell 3.

By mounting the hydrogen tank 2, the fuel cell 3, the filling device 4, and the charger 5 on the vehicle 1, hydrogen for a fuel cell vehicle and electricity for an electric vehicle can be delivered. For example, even when there is no hydrogen station or charging station (or commercial power supply) near a home of an owner of a fuel cell vehicle or an electric vehicle, the vehicle 1 can be driven to the home of the owner to refill the fuel cell vehicle with hydrogen or to charge the electric vehicle with electricity.

When the fuel cell vehicle or the electric vehicle runs out of gas or electricity at a place where no hydrogen station or charging station (or commercial power supply) is around, the vehicle 1 can be driven to the place to refill the fuel cell vehicle with hydrogen or to charge the electric vehicle with electricity.

Accordingly, the fuel cell vehicle can be filled with hydrogen easily, and the electric vehicle can be charged with electricity easily. Further, when a commercial vehicle that delivers a product between a plurality of stores is used as the vehicle 1, product delivery and hydrogen delivery can be performed at the same time, and efficiency is improved.

Figure 2:
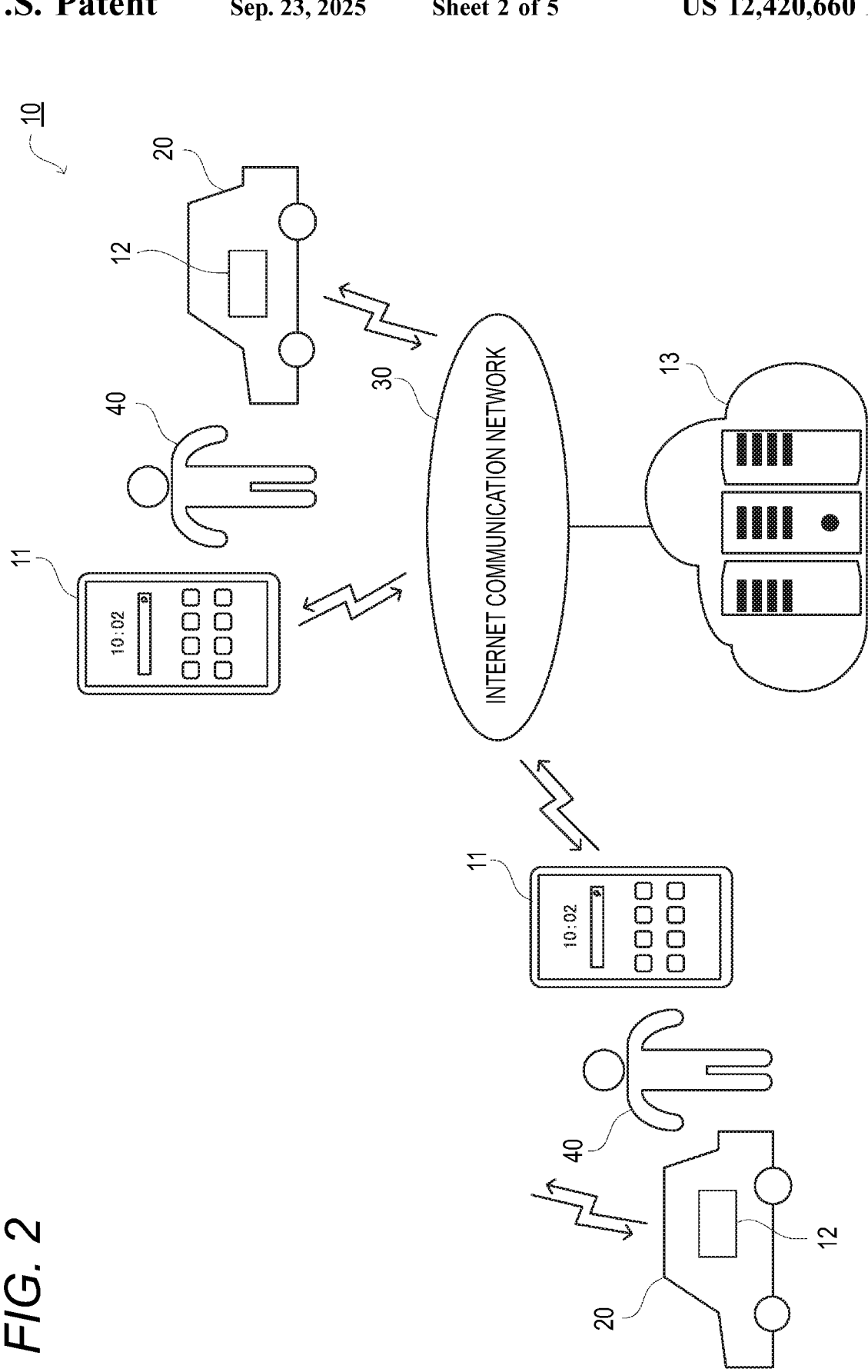
FIG. 2 is a configuration diagram illustrating an embodiment of the delivery system according to the present invention.

Next, a delivery system 10 using the vehicle 1 illustrated in FIG. 1 described above will be described with reference to FIG. 2. The delivery system 10 according to the present embodiment is a system that delivers hydrogen for a fuel cell vehicle 20. The delivery system 10 includes a plurality of terminals 11, an on-board device 12, and a server 13 capable of communicating with the plurality of terminals 11 via an Internet communication network 30.

Figure 3:
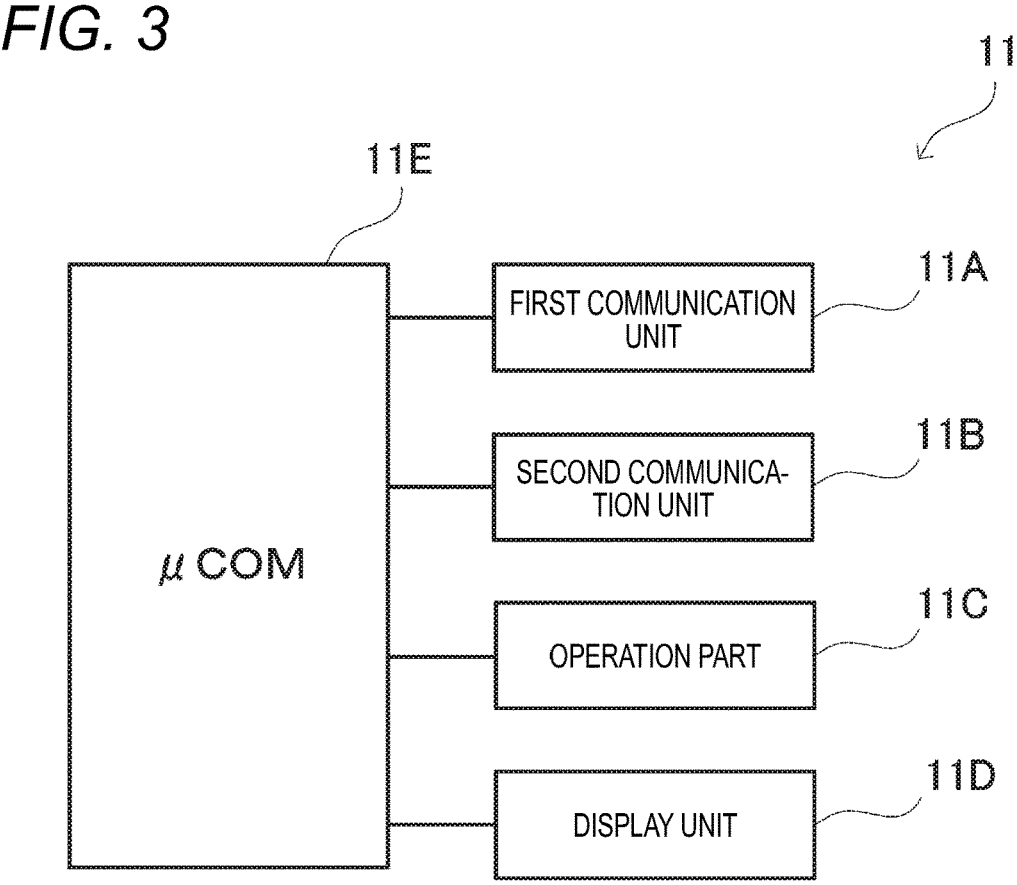
FIG. 3 is a configuration diagram of a terminal shown in FIG. 2.

The terminal 11 includes a communication terminal such as a smartphone, a tablet, or a personal computer (PC) that can be used by a user 40 of the delivery system 10. As illustrated in FIG. 3, the terminal 11 includes a first communication unit 11A, a second communication unit 11B, an operation part 11C, a display unit 11D, and a micro computer (μCOM) 11E. The first communication unit 11A is a communication unit for performing short-range communication such as Bluetooth (registered trademark) with the on-board device 12. The second communication unit 11B is a communication unit for connecting to the Internet communication network 30. Various operations are performed on the operation part 11C by the user 40. The display unit 11D displays various types of information. The μCOM 11E includes a memory such as a read only memory (ROM) or a random access memory (RAM), and a central processing unit (CPU) that operates in accordance with a program stored in the memory. The μCOM 11E performs overall control of the terminal 11.

In the present embodiment, an example will be described in which the operation part 11C and the display unit 11D are integrally configured as a touch panel. A delivery system application distributed by an operating company operating the delivery system 10 is downloaded to the terminal 11, and is stored therein.

The on-board device 12 acquires remaining-amount data of hydrogen from a multimedia or a meter mounted on the fuel cell vehicle, and transmits the acquired remaining-amount data of hydrogen to the terminal 11.

Figure 4:
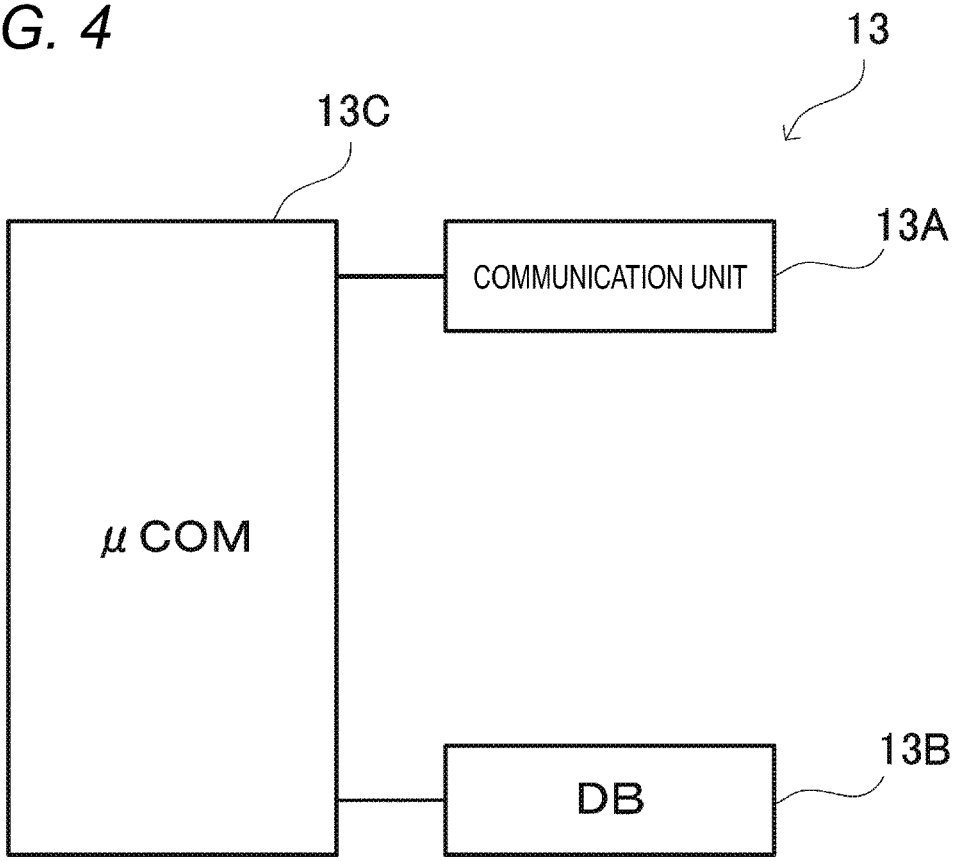
FIG. 4 is a configuration diagram of a server shown in FIG. 2.

As illustrated in FIG. 4, the server 13 includes a communication unit 13A, a database (DB) 13B, and a μCOM 13C.

The communication unit 13A is a communication unit for connecting to the Internet communication network 30. The DB 13B stores registration information (deliverable area, ID (=identification information)) and availability of the vehicle 1 to which hydrogen is to be delivered, and registration information of the user 40 (the address of the terminal 11, vehicle information, the name, address, contact address, account information of a billing destination, credit card information, and the like of the user 40).

Next, an operation of the delivery system 10 having the above-described configuration will be described with reference to FIG. 5. The terminal 11 periodically communicates with the on-board device 12 mounted on the fuel cell vehicle 20 when communication with the on-board device 12 is possible, and receives the remaining-amount data of hydrogen from the on-board device 12. The μCOM 13C of the server 13 (hereinafter, simply referred to as the server 13) functions as a remaining-amount acquisition unit, and periodically transmits a hydrogen remaining-amount request signal for requesting a hydrogen remaining amount to the registered terminal 11 (S1). When the μCOM 11E of the terminal (hereinafter, simply referred to as the terminal 11) receives the hydrogen remaining-amount request signal, the terminal 11 transmits a hydrogen remaining-amount answer signal including the latest remaining-amount data received by communication with the on-board device 12 (S2).

When the server 13 receives the hydrogen remaining-amount answer signal, the server 13 determines whether the hydrogen remaining amount is equal to or less than a predetermined value (for example, ¼ of a tank capacity) (S3). When the hydrogen remaining amount is neither equal to nor less than the predetermined value (No in S3), the server 13 returns to S1. On the other hand, when the hydrogen remaining amount is equal to or less than the predetermined value (Yes in S3), the server 13 functions as a transmission unit and transmits a hydrogen filling reservation necessity confirmation signal to the terminal 11 (S4).

When the terminal 11 receives the necessity confirmation signal, the terminal 11 performs notification by, for example, displaying the necessity confirmation signal on the display unit 11D. Specifically, the terminal 11 displays, on the display unit 11D, a message indicating that the hydrogen remaining amount is small. The terminal 11 displays, on the display unit 11D, a hydrogen filling reservation button and a reservation unnecessary button (not shown).

When the user 40 touches the reservation button, the terminal 11 transmits an answer signal indicating that the reservation is necessary to the server 13 (S5). On the other hand, when the user 40 touches the reservation unnecessary button, the terminal 11 transmits an answer signal indicating that the reservation is unnecessary to the server 13 (S5).

When the answer signal indicating that the reservation is unnecessary is received (No in S6), the server 13 lowers the predetermined value determined in S3, and then returns to S1. On the other hand, when the answer signal indicating that the reservation is necessary is received (Yes in S6), the server 13 functions as an acceptance unit, accepts the reservation, and creates a delivery schedule (S7).

Next, the delivery schedule creation executed by the server 13 in S7 will be described with reference to FIG. 6. First, the server 13 creates a delivery schedule based on position information of the fuel cell vehicles 20 registered in advance in association with a plurality of terminals 11 via which reservations are accepted during a certain period (for example, three days). Specifically, the server 13 acquires, as the position information of the fuel cell vehicles 20, addresses registered in advance in association with the plurality of terminals 11 via which the reservations are accepted, from the registration information of the users 40 stored in the DB 13B.

Figure 6:
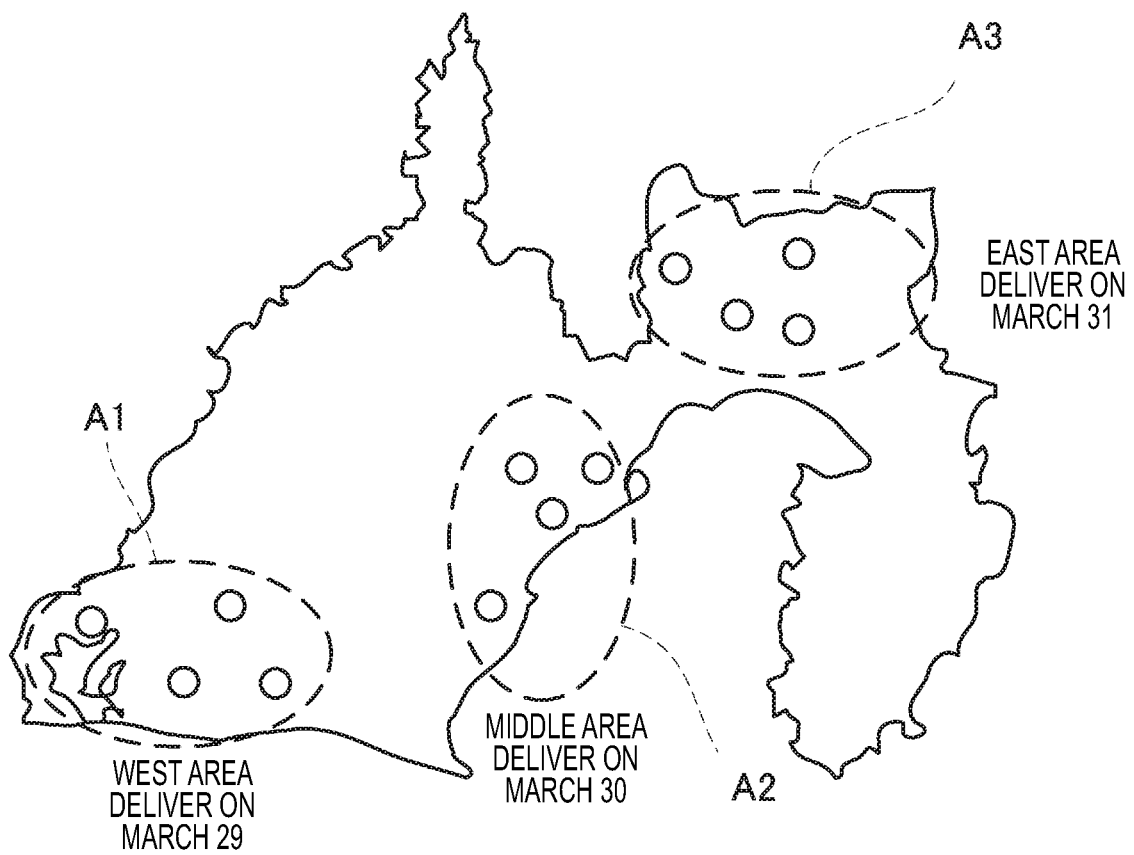
FIG. 6 is an illustrative diagram for illustrating creation of a delivery schedule performed by the server shown in FIG. 2.

In an example illustrated in FIG. 6, position information acquired when reservations of twelve fuel cell vehicles 20 are accepted is shown. Next, the server 13 sets delivery areas A1 to A3, each of which one vehicle 1 can finish going around in a predetermined period (one day in the present embodiment), based on the position information of the plurality of fuel cell vehicles 20 for which the reservations are accepted. The server 13 sets the delivery areas A1 to A3 such that all pieces of the position information are located in any one of the delivery areas A1 to A3.

The server 13 adjusts area of the delivery areas A1 to A3 according to the number of pieces of the position information of the fuel cell vehicles 20 located in the delivery areas A1 to A3, and sets the delivery areas A1 to A3 each of which one vehicle 1 can finish going around in one day. In the example illustrated in FIG. 6, three areas, i. e., a west delivery area A1, a middle delivery area A2, and an east delivery area A3, are set. For example, the server 13 may set the area of the delivery areas A1 to A3 to decrease as a distance from a hydrogen station where the vehicle 1 can be filled with hydrogen increases.

Next, the server 13 sets a delivery completion time of each of the delivery areas A1 to A3 based on the number of registered vehicles 1. In the example illustrated in FIG. 6, since only one vehicle 1 is registered, a schedule is created in which delivery is performed in the west delivery area A1 on March 29, delivery is performed in the middle delivery area A2 on March 30, and delivery is performed in the east delivery area A3 on March 31.

Figure 5:
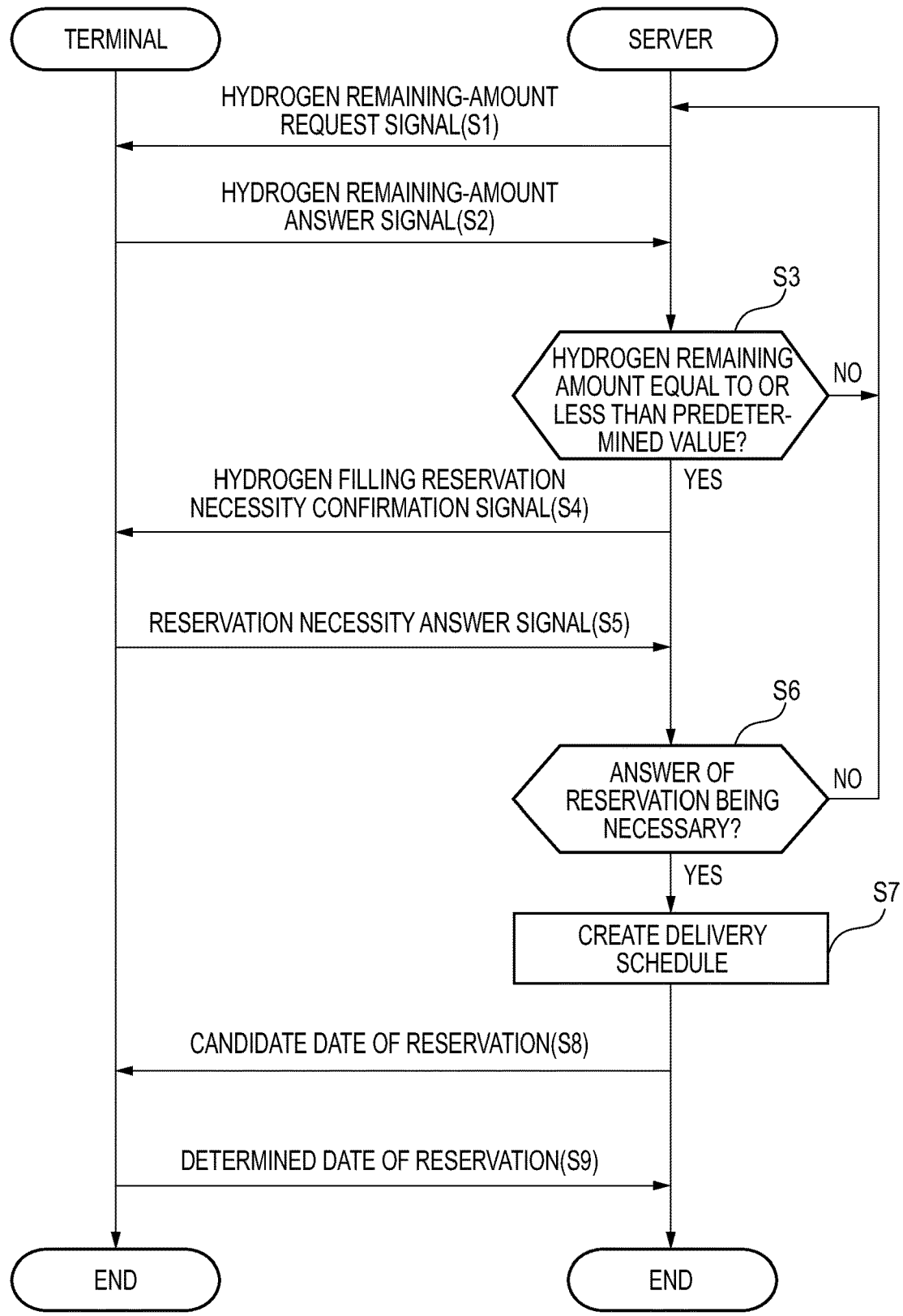
FIG. 5 is a flowchart illustrating operations of the server and the terminal shown in FIG. 2.

When the server 13 creates the delivery schedule, as illustrated in FIG. 5, the server 13 transmits a reservation candidate date to the terminal 11 according to the created delivery schedule (S8). For example, when the position information of the fuel cell vehicle associated with the terminal 11 corresponds to the middle delivery area A2, the server 13 transmits March 30 as the reservation candidate date to the terminal 11. When the terminal 11 receives the reservation candidate date, the terminal 11 performs notification by displaying the reservation candidate date on the display unit 11D or the like. When the user 40 accepts a reservation of the reservation candidate date, the user 40 performs a reservation determination operation. After the reservation determination operation, the terminal 11 transmits a reservation determination signal to the server 13 (S9).

When the reservation is determined, the server 13 confirms the reservation and ends the processing.

According to the above-described embodiment, the server 13 creates the delivery schedule of the vehicle 1 based on the position information of the fuel cell vehicle 20 registered in advance in association with the terminal 11 via which the reservation is accepted. Accordingly, an efficient delivery schedule can be created.

According to the above-described embodiment, the server 13 sets the delivery areas A1 to A3 to create the delivery schedule. Accordingly, it is possible to create a more efficient delivery schedule.

According to the above-described embodiment, the server 13 acquires the remaining amount of hydrogen through communication with the terminal 11, and transmits a reservation necessity confirmation signal to the terminal 11 when the remaining amount is equal to or less than a predetermined value. Further, when a necessity answer signal indicating that a reservation is necessary is received from the terminal 11 after the reservation necessity confirmation signal is transmitted, the server 13 accepts the reservation. Accordingly, when the remaining amount of hydrogen or the battery is low, it is possible to transmit a reservation necessity confirmation signal to the terminal 11, and thus the user can easily make the reservation.

The present invention is not limited to the above-described embodiment, and modifications, improvements, and the like can be made as appropriate. In addition, materials, shapes, dimensions, numbers, arrangement locations, and the like of components in the above-described embodiment are optional and not limited as long as the present invention can be achieved.

Although only the hydrogen filling reservation is performed with the delivery system 10 described above, the present invention is not limited thereto. A charging reservation of the electric vehicle may be performed with the delivery system 10 instead of the hydrogen filling reservation. Alternatively, both the hydrogen filling reservation and the charging reservation may be performed with the delivery system 10.

Although the example is described in which the server 13 described above acquires the remaining amount of hydrogen by receiving the remaining-amount data from the terminal 11, the present invention is not limited thereto. The terminal 11 may transmit its own movement history to the server 13, and the server 13 may acquire the remaining amount of hydrogen based on the movement history of the terminal 11. From the movement history, how long a distance the fuel cell vehicle 20 moves is roughly known, and the remaining amount of hydrogen can be acquired based on this movement distance. Accordingly, even when the terminal 11 cannot communicate with the on-board device 12, the remaining amount can be known.

Although the example is described in which the server 13 described above transmits the hydrogen filling reservation necessity confirmation signal to the terminal 11 when the remaining amount of hydrogen is small, and then accepts a reservation when an answer signal indicating that the reservation is necessary is received from the terminal 11, the present invention is not limited thereto. For example, the user 40 may operate the terminal 11 to transmit a filling reservation signal from the terminal 11 to the server 13, and the server 13 may accept the reservation when the filling reservation signal is received.

According to an embodiment, a vehicle (1) includes:
a hydrogen tank (2) that stores hydrogen;
a fuel cell (3) that generates electricity from the hydrogen in the hydrogen tank (2);
a filling device (4) that fills a fuel cell vehicle (20) with the hydrogen stored in the hydrogen tank (2); and
a charger (5) with which electricity generated by the fuel cell (3) is charged to an electric vehicle.

According to the above configuration, the hydrogen tank (2), the fuel cell (3), the filling device (4), and the charger (5) are mounted on the vehicle, and thus hydrogen for the fuel cell vehicle (20) and electricity for the electric vehicle can be delivered. Accordingly, the fuel cell vehicle (20) can be easily filled with hydrogen, and the electric vehicle can be easily charged with electricity.

According to an embodiment, a delivery system (10) includes:
a plurality of terminals (11); and
a server (13) that is capable of communicating with the plurality of terminals (11).

The server (13) includes a reservation acceptance unit (13C) that accepts at least one of a hydrogen filling reservation of a fuel cell vehicle (20) and a charging reservation of an electric vehicle through communication with the plurality of the terminals (11), and a delivery schedule creation unit (13C) that creates a delivery schedule for the vehicle (1) according to a first aspect, based on position information of the fuel cell vehicle (20) or the electric vehicle registered in advance in association with the terminal (11) via which a reservation is accepted by the reservation acceptance unit (13C).

According to the above configuration, the delivery schedule creation unit (13C) creates the delivery schedule of the vehicle (1) based on the position information of the fuel cell vehicle (20) or the electric vehicle registered in advance in association with the terminal (11) via which the reservation is accepted. Accordingly, an efficient delivery schedule can be created.

The delivery schedule creation unit (13C) may create the delivery schedule by setting delivery areas (A1 to A3), each of which one vehicle (1) can finish going around in a predetermined period, based on position information of the fuel cell vehicle (20) or the electric vehicle for which a reservation is accepted, and determining a completion time for each of the delivery areas (A1 to A3).

According to the above configuration, the delivery areas (A1 to A3) are set, and thus it is possible to create a more efficient delivery schedule.

The server (13) may include a remaining-amount acquisition unit (13C) that acquires, through communication with the terminal (11), a remaining amount of hydrogen in a hydrogen tank mounted on the fuel cell vehicle (20) or a remaining amount of electricity in a battery mounted on the electric vehicle, and a transmission unit (13C) that transmits a reservation necessity confirmation to the terminal (11) when the remaining amount acquired by the remaining-amount acquisition unit (13C) is equal to or less than a predetermined value, and when an answer indicating that a reservation is necessary is received from the terminal (11) after the reservation necessity confirmation is transmitted, the reservation acceptance unit (13C) may accept the reservation.

According to the above configuration, when the remaining amount of hydrogen or the battery is small, the reservation necessity confirmation can be transmitted to the terminal (11), and thus the user can easily make the reservation.

The remaining-amount acquisition unit (13C) of the server (13) may acquire a movement history of the terminal (11) through communication with the terminal (11), and acquire the remaining amount based on the acquired movement history.

According to the above configuration, even when the terminal (11) cannot communicate with a meter of the fuel cell vehicle or the electric vehicle and cannot acquire the remaining amount of hydrogen or the battery measured by the meter, the server (13) can acquire the remaining amount.

According to an embodiment, a server (13) can communicate with a plurality of terminals (11).

The server (13) includes a reservation acceptance unit (13C) that accepts, through communication with the plurality of terminals (11), at least one of a hydrogen filling reservation of a fuel cell vehicle (20) and a charging reservation of an electric vehicle, which are registered in advance in association with the plurality of terminals (11), and a delivery schedule creation unit (13C) that creates a delivery schedule for the vehicle (1) according to a first aspect based on position information registered in advance in association with the fuel cell vehicle (20) or the electric vehicle for which a reservation is accepted by the reservation acceptance unit (13C).

According to the above configuration, the delivery schedule creation unit (13C) creates the delivery schedule of the vehicle (1) based on the position information of the fuel cell vehicle (20) or the electric vehicle registered in advance in association with the terminal (11) via which the reservation is accepted. Accordingly, an efficient delivery schedule can be created.

According to an embodiment, a program for a delivery system causes a computer to function as a reservation acceptance unit (13C) that accepts, through communication with a plurality of terminals (11), at least one of a hydrogen filling reservation of a fuel cell vehicle (20) and a charging reservation of an electric vehicle, which are registered in advance in association with the plurality of terminals (11), and a delivery schedule creation unit (13C) that creates a delivery schedule for the vehicle (1) according to a first aspect based on position information registered in advance in association with the fuel cell vehicle (20) or the electric vehicle for which a reservation is accepted by the reservation acceptance unit (13C).

According to the above configuration, the delivery schedule creation unit (13C) creates the delivery schedule of the vehicle (1) based on the position information of the fuel cell vehicle (20) or the electric vehicle registered in advance in association with the terminal (11) via which the reservation is accepted. Accordingly, an efficient delivery schedule can be created.

According to the embodiments, it is possible to provide a vehicle, a delivery system, a server, and a program for the delivery system with which a fuel cell vehicle can be easily filled with hydrogen and an electric vehicle can be easily charged with electricity.

What is claimed is:

1. A delivery system, comprising:
    at least one delivery vehicle, the at least one delivery vehicle comprising:
        a hydrogen tank that stores hydrogen;
        a fuel cell that generates electricity from the hydrogen in the hydrogen tank;
        a filling device that fills a fuel cell vehicle with the hydrogen stored in the hydrogen tank; and
        a charger with which electricity generated by the fuel cell is charged to an electric vehicle;
    a plurality of terminals; and
    a server that is capable of communicating with the plurality of terminals,
    wherein the server is configured to:
        transmit, to the plurality of terminals, a remaining-amount request signal requesting a remaining amount of a hydrogen tank mounted on a fuel cell vehicle or a remaining amount of a battery mounted on a electric vehicle;
        receive, from the plurality of terminals, a remaining-amount answer signal indicating the remaining amount of the hydrogen tank mounted on the fuel cell vehicle or the remaining amount of the battery mounted on the electric vehicle,
        transmit, to the plurality of terminals, a reservation necessity confirmation signal when the remaining-amount answer signal indicates that the remaining amount is equal to or less than a predetermined value, receive, from the plurality of terminals, a request signal requesting at least one of a hydrogen filling reservation for the fuel cell vehicle and a charging reservation for the electric vehicle and accept a reservation request from the terminal associated with the request signal, and create a delivery schedule for the at least one delivery vehicle based on position information of the fuel cell vehicle or the electric vehicle registered in advance in association with the terminal via which a reservation is accepted.

2. The delivery system according to claim 1, wherein the server is further configured to create the delivery schedule by setting delivery areas, each of which one of the at least one delivery vehicle is able to finish going around in a predetermined period, based on the position information of the fuel cell vehicle or the electric vehicle for which the reservation is accepted, and determining a completion time for each of the delivery areas.

3. The delivery system according to claim 1, wherein the server is further configured to acquire a movement history of the plurality of terminals, and determine the remaining amount based on the acquired movement history.

4. A server capable of communicating with a plurality of terminals, wherein the server is configured to:

transmit, to the plurality of terminals, a remaining-amount request signal requesting a remaining amount of a hydrogen tank mounted on a fuel cell vehicle or a remaining amount of a battery mounted on a electric vehicle;

receive, from the plurality of terminals, a remaining-amount answer signal indicating the remaining amount of the hydrogen tank mounted on the fuel cell vehicle or the remaining amount of the battery mounted on the electric vehicle, transmit, to the plurality of terminals, a reservation necessity confirmation signal when the remaining-amount answer signal indicates that the remaining amount is equal to or less than a predetermined value, receive, from a plurality of terminals, a request signal requesting at least one of a hydrogen filling reservation for the fuel cell vehicle and a charging reservation for the electric vehicle, which are registered in advance in association with the plurality of terminals, and accept a reservation request from the terminal associated with the request signal, and create a delivery schedule for a delivery vehicle based on position information registered in advance in association with the fuel cell vehicle or the electric vehicle for which a reservation is accepted.

5. A computer-readable storage medium storing program for delivery system, the program causing a computer to:

transmit, to a plurality of terminals, a remaining-amount request signal requesting a remaining amount of a hydrogen tank mounted on a fuel cell vehicle or a remaining amount of a battery mounted on a electric vehicle;

receive, from the plurality of terminals, a remaining-amount answer signal indicating the remaining amount of the hydrogen tank mounted on the fuel cell vehicle or the remaining amount of the battery mounted on the electric vehicle, transmit, to the plurality of terminals, a reservation necessity confirmation signal when the remaining-amount answer signal indicates that the remaining amount is equal to or less than a predetermined value, receive, from the plurality of terminals, a request signal requesting at least one of a hydrogen filling reservation for the fuel cell vehicle and a charging reservation for the electric vehicle, which are registered in advance in association with the plurality of terminals and accept a reservation request from the terminal associated with the request signal, and create a delivery schedule for a delivery vehicle based on position information registered in advance in association with the fuel cell vehicle or the electric vehicle for which a reservation is accepted.

\* \* \* \* \*